No. 803,314. PATENTED OCT. 31, 1905.
B. W. STURDEVANT & A. W. SIDESINGER.
COOKING UTENSIL RECEPTACLE.
APPLICATION FILED JUNE 2, 1905.
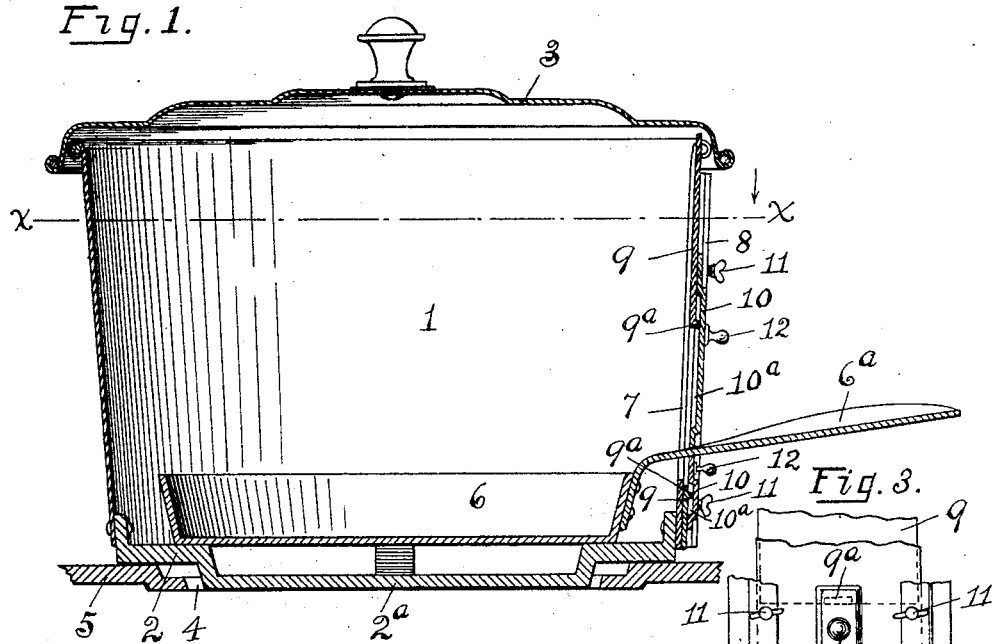
Fig. 1.
Fig. 3.
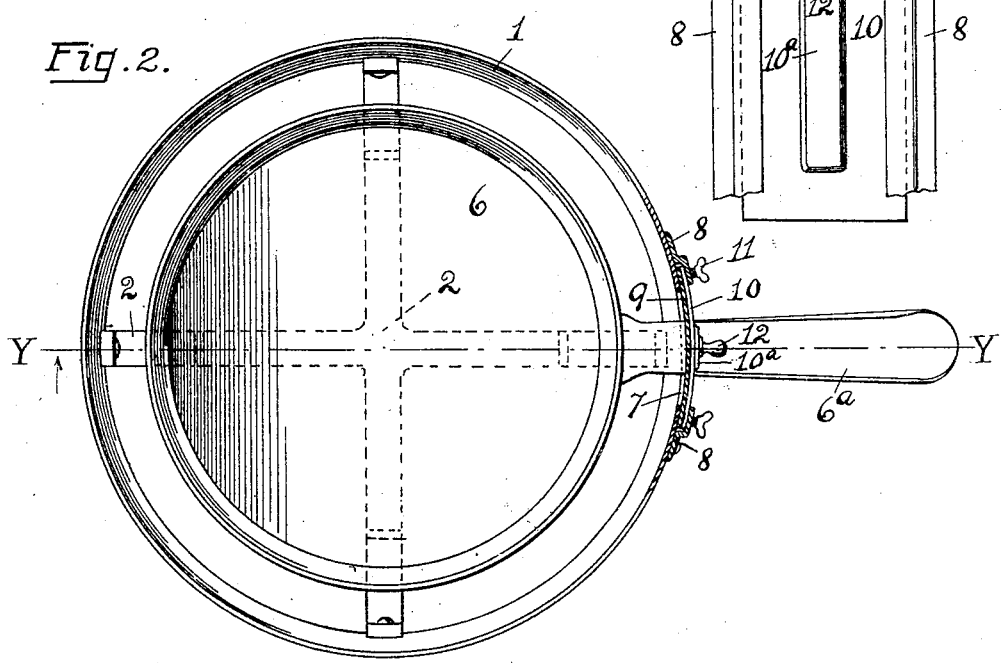
Fig. 2.
WITNESSES:
D. C. Walter
C. A. D. Young.
INVENTORS.
B. W. Sturdevant &
A. W. Sidesinger,
By Owen & Owen
Their attys.

UNITED STATES PATENT OFFICE.

BURTON W. STURDEVANT AND ALEXANDER W. SIDESINGER, OF TOLEDO, OHIO.

COOKING-UTENSIL RECEPTACLE.

No. 803,314.     Specification of Letters Patent.     Patented Oct. 31, 1905.

Application filed June 2, 1905. Serial No. 263,428.

*To all whom it may concern:*

Be it known that we, BURTON W. STURDEVANT and ALEXANDER W. SIDESINGER, citizens of the United States, and residents of Toledo, in the county of Lucas and State of Ohio, have invented certain new and useful Improvements in Cooking-Utensil Receptacles; and we do hereby declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to inclosing receptacles for cooking utensils of the class adapted to hold skillets, stewing vessels, frying-pans, or the like and to confine and cause the odors and fumes arising from the articles being prepared to be directed into the stove to enable them to pass off through the flue thereof.

The primary object of our invention is the provision of a receptacle of this class having an opening for receiving the handle of a cooking vessel and shiftable means associated with said receptacle whereby the opening may be entirely closed or its position varied to accommodate the handles of varying heights of vessels.

Further objects of our invention will be apparent by reference to the following description and to the accompanying drawings, in which—

Figure 1 is a central vertical section of the receptacle embodying our invention, together with a skillet, taken on the dotted line Y...Y in Fig. 2. Fig. 2 is a cross-section of the receptacle, taken on the dotted line $x$ $x$ in Fig. 1; and Fig. 3 is a partial elevation of the means employed for shifting the position of the handle-opening.

Referring to the drawings, 1 represents the receptacle embodying our invention, which may be made of any suitable shape or size and has its bottom formed with an open grate 2 and its top normally closed by a removable cover 3. The grate may comprise any number of crossing or intersecting bars and is preferably formed with the lowered portion $2^a$ adapted to project a short distance within the opening 4 of a stove-top 5, thus preventing the removal of the receptacle from over the stove-opening except by the lifting of the same therefrom and also enabling smaller vessels and kettles than the skillet 6 shown to be supported nearer the blaze or fire. The grate 2 has its arms secured in any suitable manner to the walls of the receptacle 1.

In one side of the receptacle 1 is formed a vertical slot or opening 7 of suitable width to permit the ready insertion therein of the handle $6^a$ of a skillet, stewing-pan, or other cooking vessels and extending from the top to substantially the bottom of said receptacle. Secured to the side of the receptacle 1 adjacent to and in parallelism with the vertical edges of the slot 7 are the guide or leader strips 8, which have their inner edges spaced from the wall or side of the receptacle to form guideways, as shown.

Mounted within the slot or opening 7 and guided in their movements by the guide-strips 8 are two sets of plates 9 and 10, one set being mounted below and the other above the portion of the slots 7 through which a handle $6^a$ projects, as shown in Fig. 1. The plates 9 and 10 of each set have their contiguous faces abutting and are adapted to slide longitudinally of each other to enable them to be adjusted to fill the space disposed above or below the handle $6^a$, and thus vary the position or size of the opening between the contiguous edges of the two sets to suit the position or size of the handle of the inclosed cooking vessel or entirely close said opening. In order to limit the independent movement of the plates of each set, the plate 9 is formed at its inner end with an outwardly-projecting tongue $9^a$, which extends within a centrally-disposed longitudinal groove or depression $10^a$, formed in the contiguous face of the companion plate 10. Each set of plates is retained in adjusted position by means of the binding-screws 11, which are threaded in apertures provided in the flanged or spaced portions of the guide-strip 8 and are adapted when tightened to press the edges of the plates against the wall of the receptacle 1 at the sides of the slot 7. A handle or knob 12 is secured to the outer face of the plate 10 to provide a grip for facilitating the adjustment thereof.

It will thus be apparent that one or more cooking vessels may be arranged within the receptacle 1 either in superimposed or other position and that the slides 9 and 10 may be positioned to tightly close the opening or slot 7 or adjusted to suit the position of a handle on any one of the vessels and enable it to project without the receptacle. It is also obvious that by reason of the receptacle 1 being closed except at its bottom the fumes and odors arising from the cooking will be carried by the draft down through the open grate and into the stove, from whence it passes off by way of the flue.

Having thus described our invention, what we claim as new, and desire to secure by Letters Patent, is—

1. An inclosing receptacle, having means for providing an opening for the handle of a cooking vessel, said means being shiftable to vary the position of said opening, and means for locking said shiftable means in adjusted position.

2. An inclosing receptacle having an open-grated bottom and a slot in a portion of its casing, and means for closing said slot or providing a restricted opening therein for receiving a projecting element, said means being shiftable to vary the position of said opening.

3. An inclosing receptacle, having an open-grated bottom and a slot provided in one of its walls, two sets of plates adjustably mounted to close said slot or provide a restricted opening therein for receiving the handle of a cooking vessel.

4. An inclosing receptacle having an open-grated bottom and a slot provided in its wall, two sets of plates adjustably mounted to close said slot or provide an opening therethrough for the handle of a cooking vessel, said plates being shiftable to vary the position of said opening, and means for retaining them in adjusted position.

5. An inclosing receptacle having its vertical wall provided with a slot, guide-strips secured to the wall at the sides of said slot, and means guided by said strips for providing a restricted opening for the handle of a vessel, said means being shiftable to vary the position of said opening.

In testimony whereof we have hereunto signed our names to this specification in the presence of two subscribing witnesses.

BURTON W. STURDEVANT.
ALEXANDER W. SIDESINGER.

Witnesses:
MARY I. SHAY,
CORNELL SCHREIBER.